F. N. BIERCE.
CABLE SPLICE.
APPLICATION FILED APR. 17, 1912.
1,097,289.
Patented May 19, 1914.
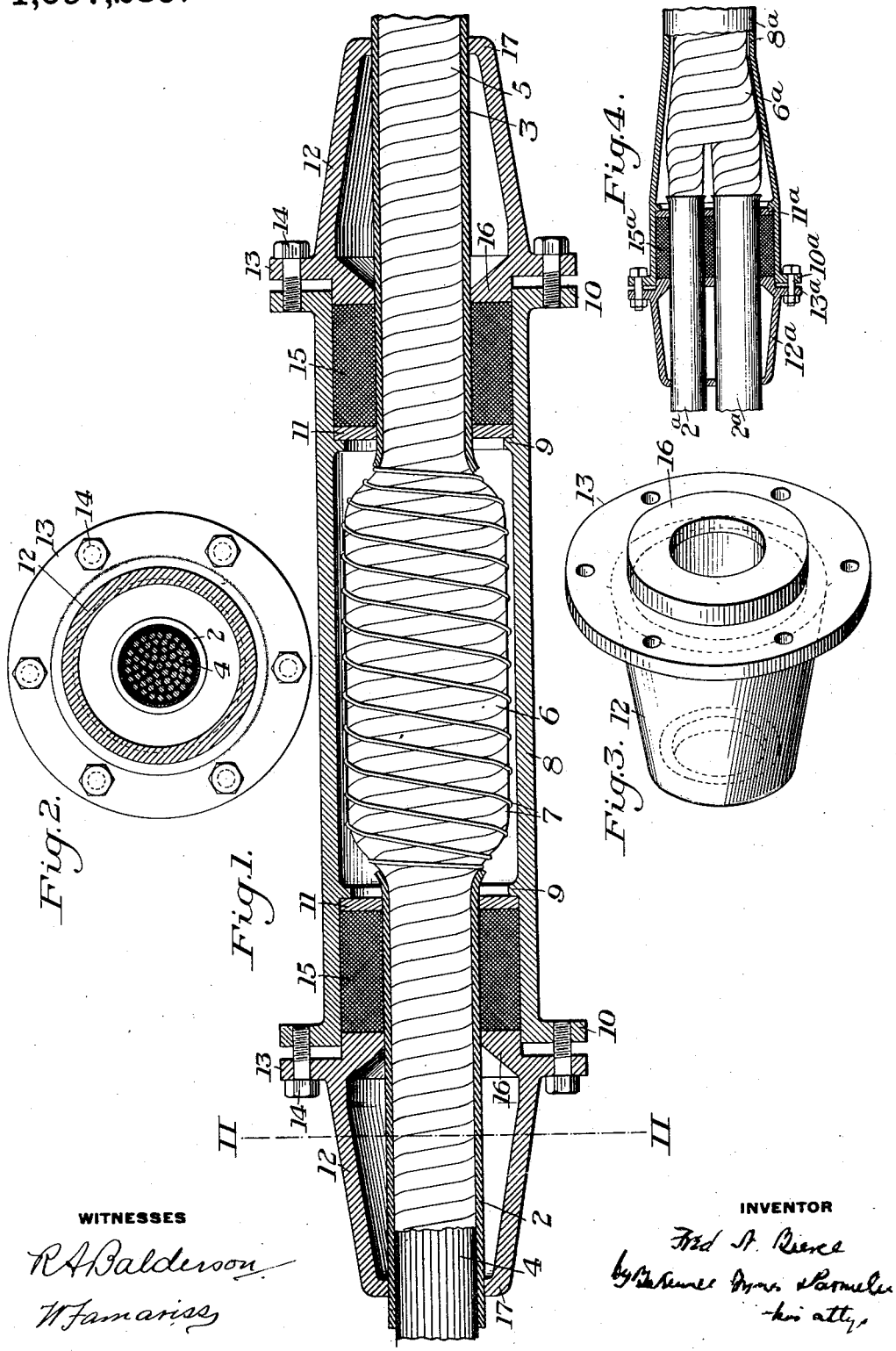
WITNESSES
INVENTOR

UNITED STATES PATENT OFFICE.

FRED N. BIERCE, OF CINCINNATI, OHIO, ASSIGNOR OF ONE-HALF TO SAM S. EINSTEIN, OF CINCINNATI, OHIO.

CABLE-SPLICE.

1,097,289.   Specification of Letters Patent.   Patented May 19, 1914.

Application filed April 17, 1912. Serial No. 691,531.

*To all whom it may concern:*

Be it known that I, FRED N. BIERCE, a resident of Cincinnati, in the county of Hamilton and State of Ohio, have invented a new and useful Improvement in Cable-Splices, of which the following is a full, clear, and exact description, reference being had to the accompanying drawings, forming part of this specification, in which—

Figure 1 is a sectional view of one form of my improved sleeve, showing the device applied to a spliced cable; Fig. 2 is a sectional view on the line II—II of Fig. 1; Fig. 3 is a perspective view of one of the glands; and Fig. 4 is a sectional view of a slightly modified form of device.

This invention relates to cable splices, and more particularly, to closures or seals for the ends of the casings of contiguous sections of an electric cable.

It is designed to provide a cheap, simple and efficient device for covering the wires at the splice where the ends of the wires of one section of the cable are connected to the ends of the wires of the next section, to thereby exclude moisture from the cable.

A further object of my invention is to provide means for supporting the ends of two sections of the cable at two points beyond the stuffing boxes, to prevent any rocking movement between the ends of the cable sections and the sleeve, and thereby avoid injury to the packing at the joints between the splice covering and the glands.

I am aware that it is old to cover the splice between two contiguous sections of an electric cable by means of a sleeve and to seal the joints by means of glands and a compressible packing member. In all of these devices, however, the glands merely engage the casing of the cable for a short distance immediately adjacent to the packing ring, which permits the sections of the cables to oscillate in the glands and thereby injure the packing rings and destroy them for the purpose for which they are intended.

The precise nature of my invention will be best understood by reference to the accompanying drawings, which will now be described, it being premised, however, that various changes may be made in the details of construction and arrangement of the parts, without departing from the spirit and scope of my invention, as defined in the appended claims.

In the drawings, the numerals 2 and 3 designate the casings of the continuous cable sections 4 and 5, respectively, and 6 the splice between the ends of the two sections, in which the ends of the individual wires of one section have been spliced to the individual wires of the other section. The splice 6 is wrapped with the usual insulating tape and cord 7 to retain the wires in the proper position with relation to each other.

8 designates a sleeve which may be made of any well known material, and which is provided with annular flanges 9, on the interior thereof and near both ends of the sleeve. This sleeve is also provided with outwardly extending annular flanges 10, for the purpose hereinafter described.

11, 11 designate washers which abut against the internal flanges 9 and which are provided with openings through the centers thereof, which are approximately the same diameter as the outer diameter of the casings 2 and 3. Each end of the sleeve 8 is provided with a gland 12, having outwardly extending annular flanges 13, and are provided with openings, through which the screws 14 extend, the ends of said screws having a screw-threaded engagement with screw-threaded openings in the flanges 10.

15 designates packing rings interposed between the washers 11 and the glands 12, for forming tight joints between the sleeve 8 and the casings 2 and 3. These gland rings engage the casings at a point within the sleeve, as indicated at 16, and are also each provided with extensions having annular openings therethrough for the cables, and whereby the cables are supported at a point remote from the sleeve.

When the device is applied, a gland 12, a packing member 15, a sleeve or collar 11, and the sleeve 8 are passed on to one of the sections of the cable, and the gland, packing member and collar are passed on to the other member. The splice is then made in the usual manner, and the sleeve 8 is then moved to its proper position with relation to the splice 6. The washers 11, packing members 15 and glands 12 are then moved into position, and the glands are secured to the sleeve by means of the screws 14 to compress the packing members 15 between the washers 11 and the ends of the glands 12 to expand the packing members against the wall of the sleeve and the outer faces of the casings 2 and 3:

In Fig. 4, I have shown an arrangement in which two cables branch from a single cable and in which I have applied the same reference numerals with the letter "a" affixed. In this construction, the washer 11ª, packing 15ª and gland 12ª at one end of the casing are provided with two openings for the two cable sections which are spliced to the main cable.

The advantages of my invention result from the provision of a sleeve and glands secured thereto, together with expansible packing members interposed between the casings of the cable sections and the sleeve. A further advantage results from the provision of means for supporting the contiguous sections of the spliced cables remote from the inner end of the gland, to thereby provide a long seat or support for the cable section and prevent any rocking movement of the cable sections.

I claim:

1. A covering for a cable splice between two sections of a cable, comprising two glands for receiving the ends of the cable sections, a shoulder on each of said glands, a continuous splice-inclosing sleeve extending from gland to gland, the smallest inner diameter of said sleeve being greater than the diameter of the splice to permit the sleeve to be passed over the splice, the shoulders on said glands being arranged to be seated within the ends of the sleeve, a washer in each end of the sleeve surrounding the ends of the cable sections, there being a stuffing box formed in each end of the sleeve between the washers and the shoulders on the glands, a packing member in each of said boxes between the washers and glands, and means for drawing the glands toward each other to compress said packing members to seal the space between the cable sections and the sleeve; substantially as described.

2. A covering for a cable splice between two sections of a cable, comprising two glands, each of said glands having a chamber therein, openings through both ends of the glands arranged to receive and engage the casings of the cable sections, a shoulder on the inner end of each of said glands, a sleeve extending from gland to gland, the smallest inner diameter of said sleeve being greater than the diameter of the splice to permit the sleeve to be passed over the splice, the shoulders on the glands being seated within the casing of the sleeve, a washer in each end of the sleeve surrounding and engaging the casings of the cable sections, there being a stuffing box formed in each end of the sleeve between the washers and the shoulders on the glands, a packing member in each stuffing box engaging the inner wall of the sleeve and the outer wall of the cable casing, and means for drawing the glands toward the sleeves to compress the packing members within the space between the casings of the cable sections and the sleeve; substantially as described.

In testimony whereof, I have hereunto set my hand.

FRED N. BIERCE.

Witnesses:
ALFRED M. ALLEN,
K. SMITH.